(12) United States Patent
Reeser et al.

(10) Patent No.: US 11,076,628 B2
(45) Date of Patent: Aug. 3, 2021

(54) ON-MACHINE SEASONING DRUM SYSTEM

(71) Applicant: PPM TECHNOLOGIES HOLDINGS, LLC, Newberg, OR (US)

(72) Inventors: Devin Ray Reeser, Portland, OR (US); Eric Jason Doern, Sherwood, OR (US)

(73) Assignee: PPM TECHNOLOGIES HOLDINGS, LLC, Newberg, OR (US)

( * ) Notice: Subject to any disclaimer, the term of this patent is extended or adjusted under 35 U.S.C. 154(b) by 595 days.

(21) Appl. No.: 15/687,280

(22) Filed: Aug. 25, 2017

(65) Prior Publication Data

US 2018/0055085 A1 Mar. 1, 2018

Related U.S. Application Data

(60) Provisional application No. 62/380,278, filed on Aug. 26, 2016.

(51) Int. Cl.
*A23P 20/13* (2016.01)

(52) U.S. Cl.
CPC .................................. *A23P 20/13* (2016.08)

(58) Field of Classification Search
CPC A23P 20/13; A23P 10/00; A23P 20/00; A23P 30/00
USPC .......... 99/494; 118/693, 686, 687, 680, 681, 118/689, 16, 17, 18, 19, 22, 23, 25, 28, 118/53, 54, 214, 228, 217, 218, 55, 26, 118/30, 24, 57, 52, 602, 215, 216, 227, 118/230, 232, 233, 239, 241, 244, 256, 118/258, 262, 263, 416, 418, 425, 426
See application file for complete search history.

(56) References Cited

U.S. PATENT DOCUMENTS

| | | | |
|---|---|---|---|
| 4,004,837 A * | 1/1977 | Main | B60B 7/08 301/37.42 |
| 5,351,807 A | 10/1994 | Svejkovsky | |
| 5,794,757 A | 8/1998 | Svejkovsky et al. | |
| 5,842,678 A | 12/1998 | Svejkovsky | |
| 6,119,849 A | 9/2000 | Svejkovsky et al. | |
| 6,216,850 B1 | 4/2001 | Svejkovksy et al. | |
| 6,453,801 B1 * | 9/2002 | Masel | A47J 27/04 99/330 |
| 6,588,363 B1 | 7/2003 | Burke et al. | |
| 6,840,664 B2 | 1/2005 | Burke et al. | |
| 6,997,134 B2 * | 2/2006 | Bayus | A23G 3/0085 118/13 |
| 9,370,197 B1 * | 6/2016 | Karpinsky | A23G 3/2076 |
| 9,657,539 B2 * | 5/2017 | Gupta | E21B 19/164 |
| 10,383,962 B2 * | 8/2019 | Davison | B08B 7/0071 |
| 2002/0092427 A1 * | 7/2002 | Masel | A23L 5/11 99/403 |
| 2014/0088337 A1 * | 3/2014 | Hedgecock | A61N 2/12 600/9 |
| 2015/0101826 A1 * | 4/2015 | Gupta | E21B 19/164 166/377 |
| 2017/0056537 A1 * | 3/2017 | Davison | H02K 15/125 |
| 2019/0233183 A1 * | 8/2019 | Linton | B65D 43/163 |

* cited by examiner

*Primary Examiner* — Dana Ross
*Assistant Examiner* — Joseph W Iskra
(74) *Attorney, Agent, or Firm* — McCoy Russell LLP

(57) ABSTRACT

Systems and methods are provided for seasoning food products in a production line. In one example, a system includes a motor assembly, a substantially cylindrical drum coupled to a ring mount, and a drive ring assembly includes magnets within the drive ring assembly to selectively retain the drum.

20 Claims, 15 Drawing Sheets

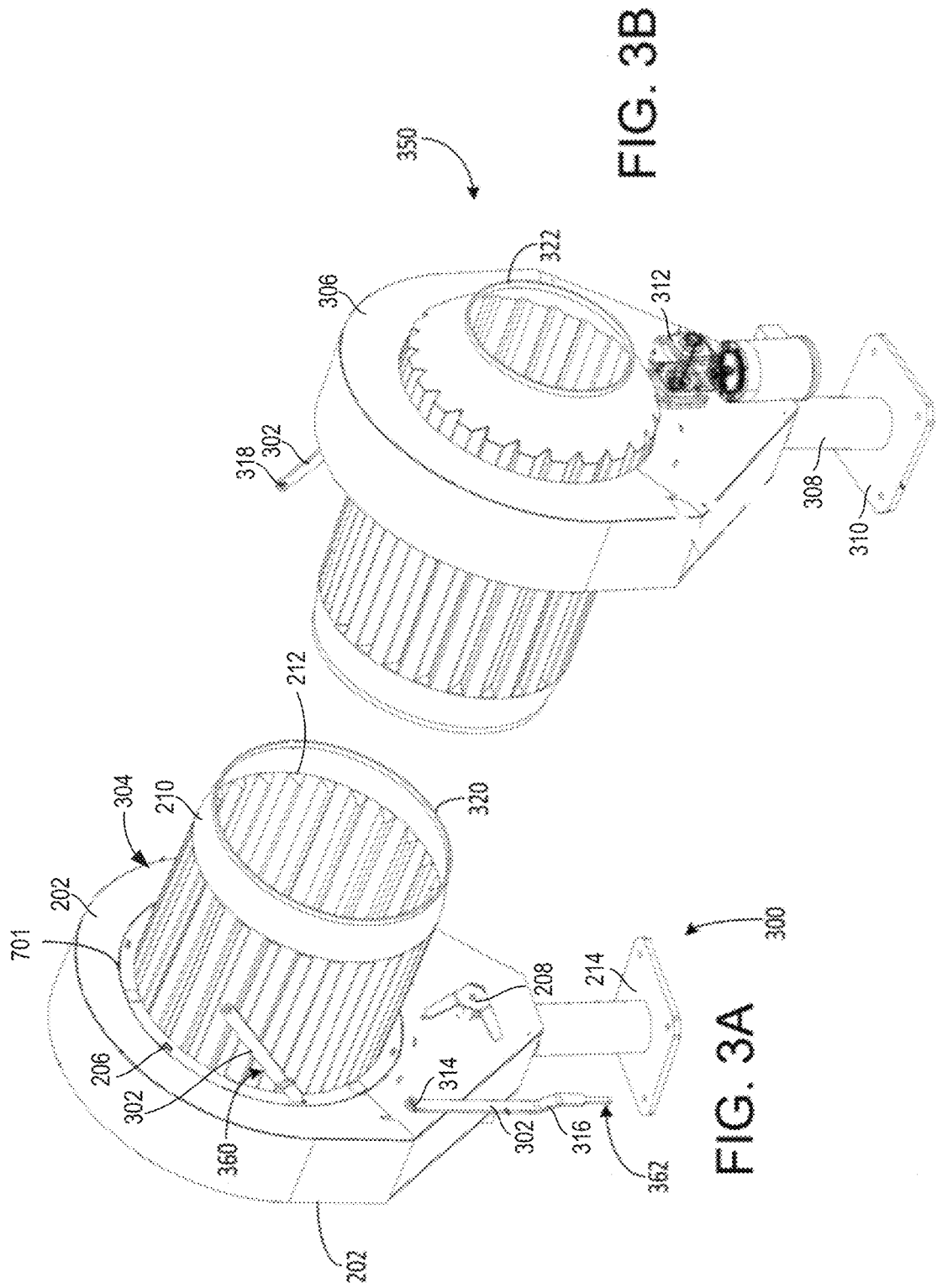

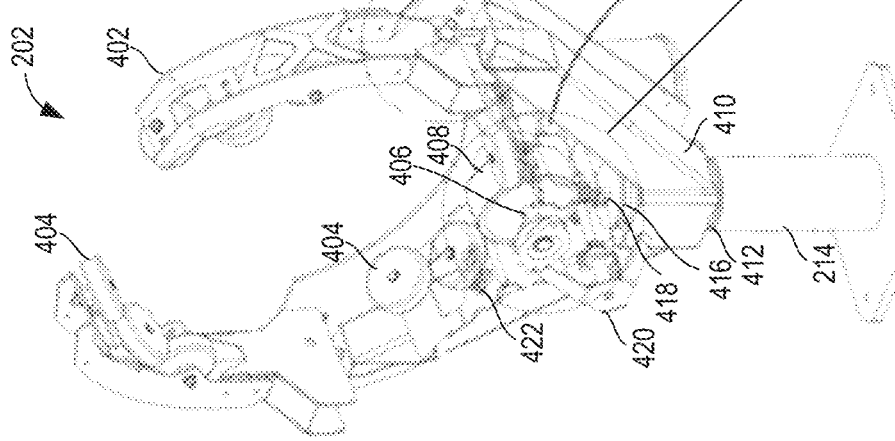
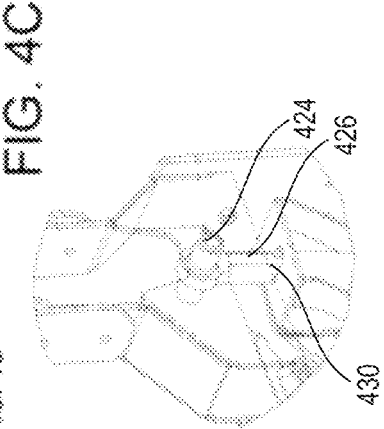
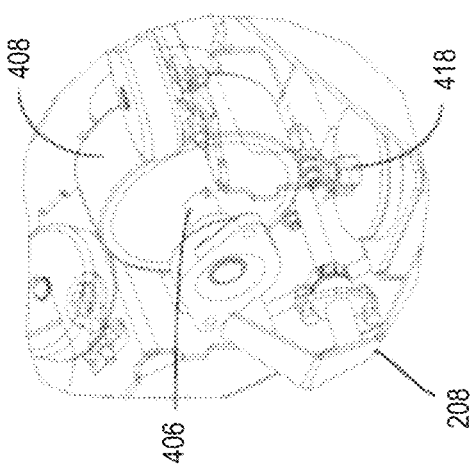

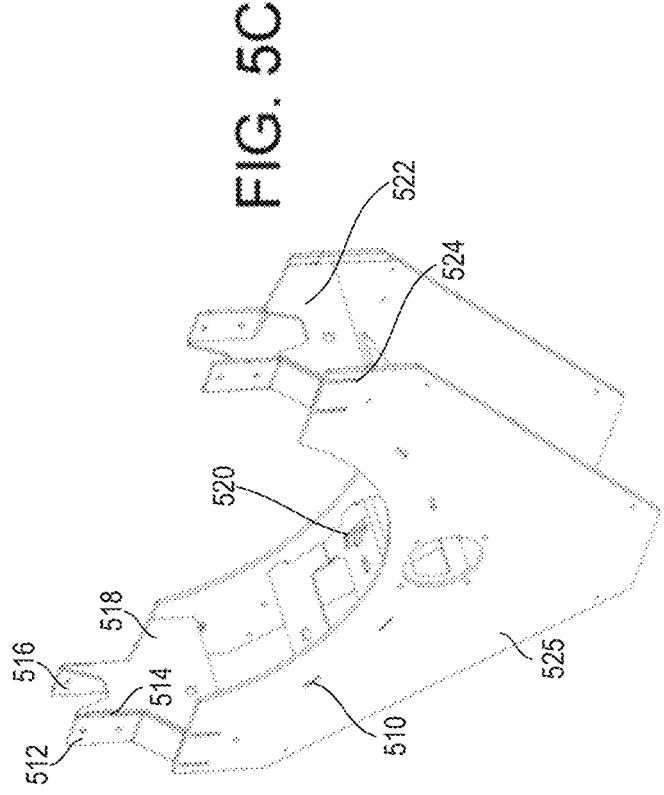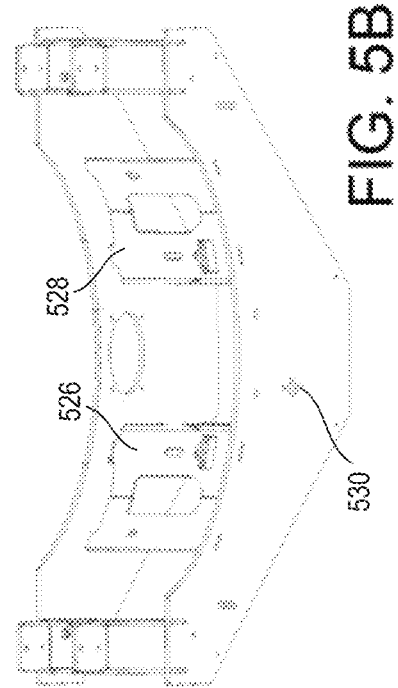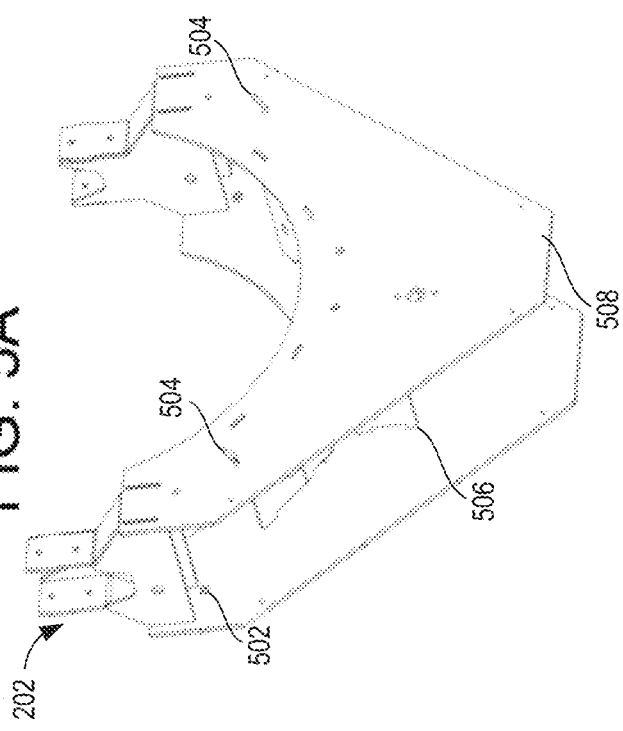

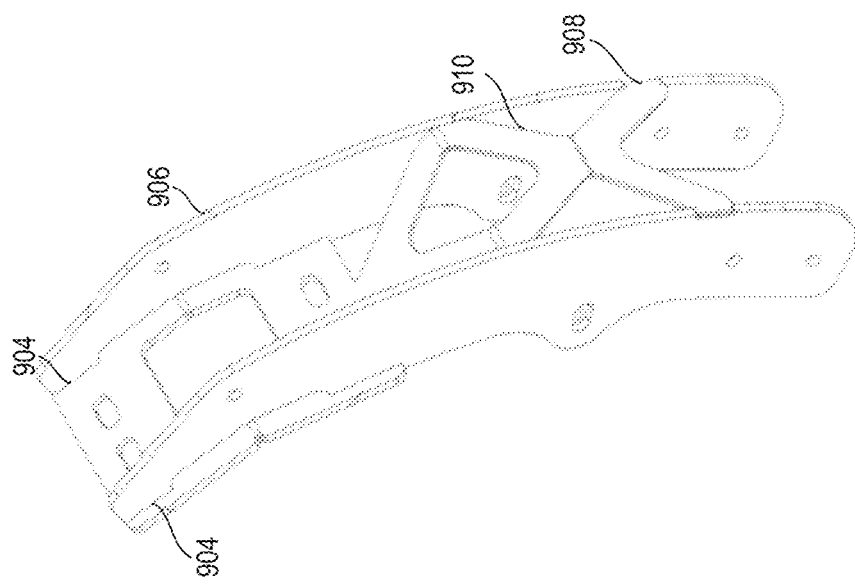
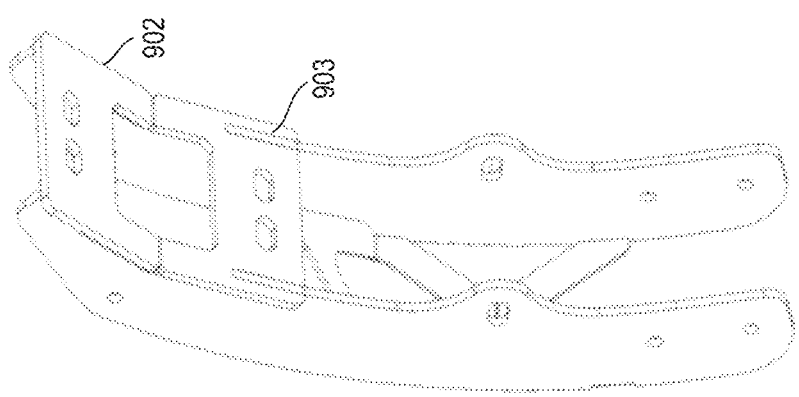
FIG. 9

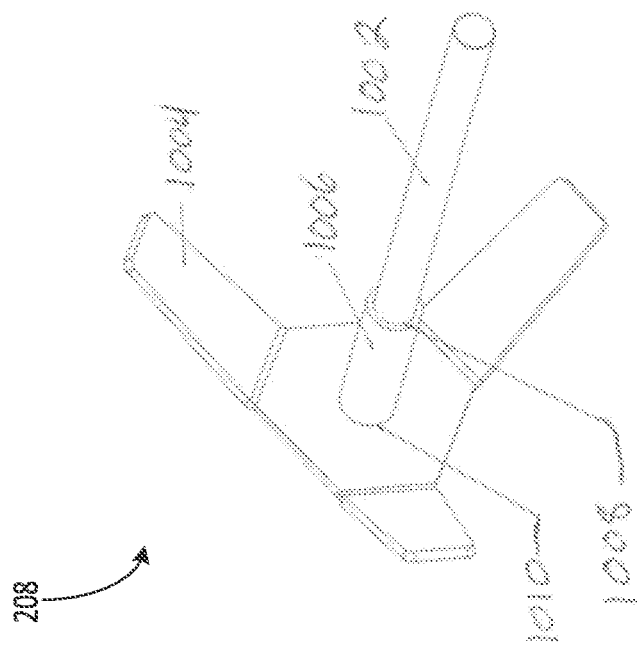
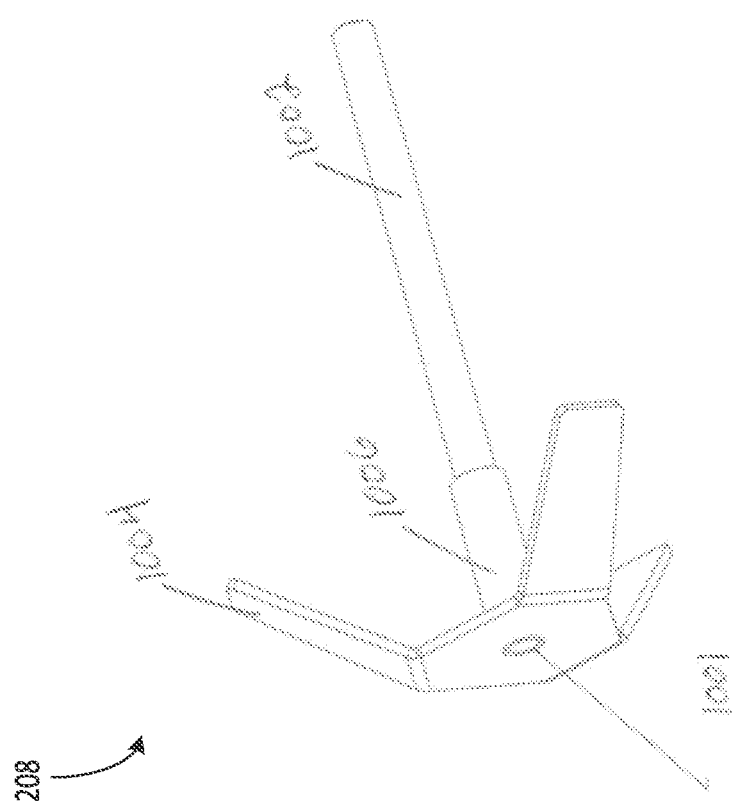
FIG. 10A
FIG. 10B

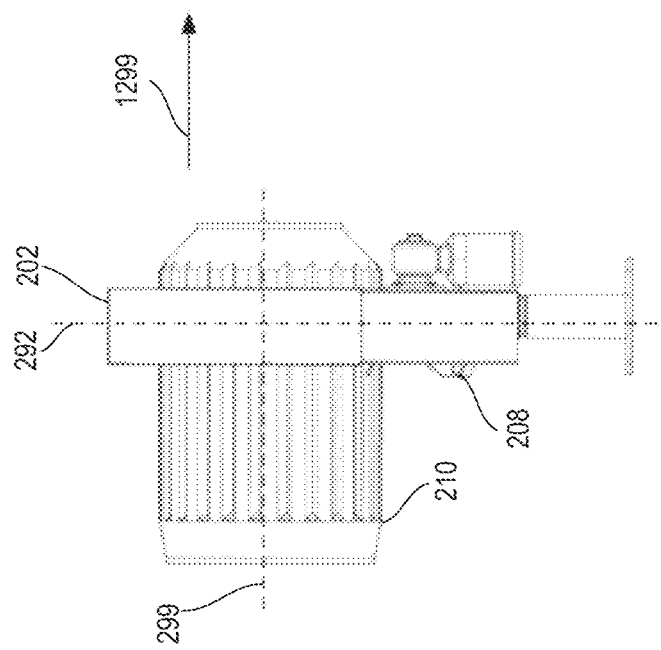
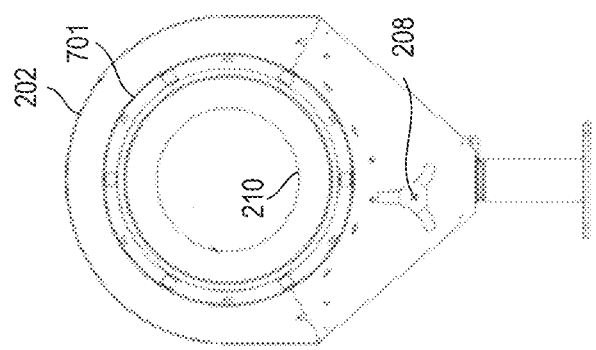
FIG. 12A
FIG. 12B

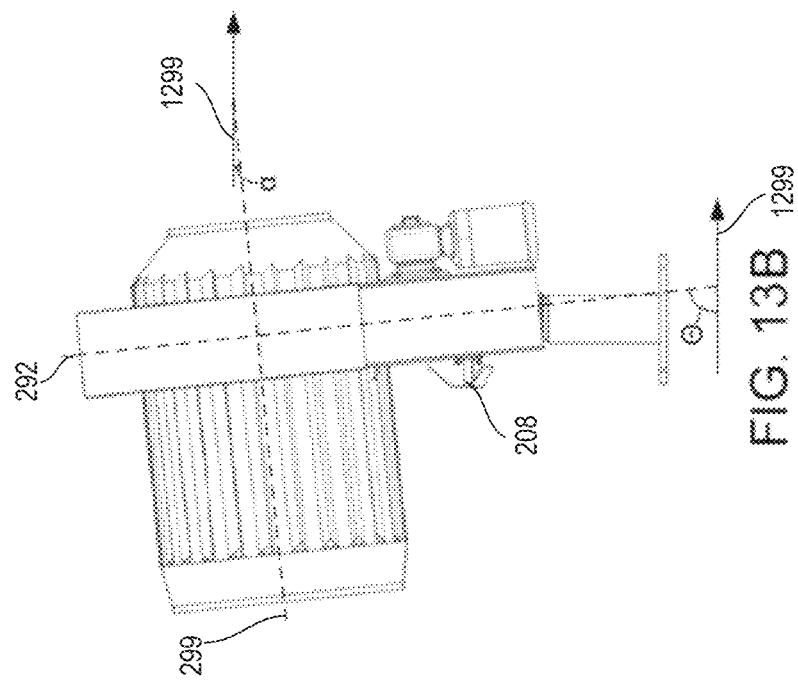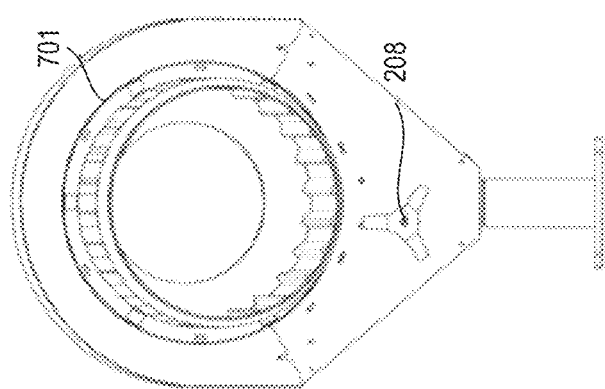

ON-MACHINE SEASONING DRUM SYSTEM

CROSS REFERENCE TO RELATED APPLICATIONS

The present application claims priority to U.S. Provisional Application No. 62/380,278, entitled "ON-MACHINE SEASONING DRUM SYSTEM," filed on Aug. 26, 2016, the entire contents of which are hereby incorporated by reference for all purposes.

FIELD

The present description relates generally to food preparation machinery and particularly an apparatus for applying seasonings to food products.

BACKGROUND/SUMMARY

Seasoning drums, also referred to as tumblers, may be used in the food processing industry to season snack foods, such as potato chips and the like.

There are numerous potential drawbacks that may exist with current food processing equipment and techniques, specifically the seasoning of food products. As one example, seasoning drums are typically relatively large components that are difficult for operators to clean or replace due to the complex connection of the drum to a drive motor and optionally a connection to another machine within the production line.

As one example, due to the difficulty of removal of current seasoning drums, the food production line may need to be stopped completely in order to disconnect the drum from the production line so that it may be cleaned. Therefore, if a new seasoning batch is being produced or if the seasoning is being changed between batches, there may be a prolonged period of time in which the production line is not actively outputting product. Additionally, disconnecting the drum from the production line may be an arduous task needing one or more workers, ladders, tools, and the like.

However, the inventors herein have recognized potential solutions to production delays as a result of cleaning or replacing the seasoning drum. In one example, the issues described above may be addressed by an on-machine seasoning drum system comprising a motor assembly, a drive ring assembly comprising a magnetic coupler and a seasoning drum, wherein the drive ring assembly is selectively coupled to the seasoning drum and wherein the seasoning drum is selectively retained within an interior of the motor via the magnetic coupler disposed on the drive ring assembly. In this way, the seasoning drum may be easily removed from the motor assembly in order to be cleaned or replaced without excessive production down time. The ease of cleaning further enables improved sanitary performance as the seasoning drum directly contacts food products and the seasoning.

In an embodiment, not only is it possible to more quickly and easily clean and/or replace the seasoning drum, but this may further result in more consistent and even seasoning of products. This may be accomplished via an actuating device selectively adjusted by a user to decouple the seasoning drum from the drive ring assembly. In one example, the actuating device is a lever, which may be forced from a first position to a second position, the second position corresponding to a detachment of the magnetic coupler. Specifically, a force actuating the lever overcomes a coupling force associated with the magnetic coupler. This may prevent the displacement of food and other forces acting on surfaces of the drum to dislodge the magnetic coupling. As such, the magnetic coupler is selectively decoupled via a user and is not decoupled during the seasoning and/or rotating process.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows a front isometric view of an on-machine seasoning drum.

FIG. 3B shows a rear isometric view of an on-machine seasoning drum.

FIG. 4A shows a partially deconstructed view of a motor assembly.

FIG. 4B shows a detailed cutaway view of the internal workings of an angle adjustment.

FIG. 4C shows a detailed cutaway view of internal components of the motor housing.

FIG. 5A is a front isometric view of a drum frame.

FIG. 5B is a rear isometric view of a drum frame.

FIG. 5C is a top-down isometric view of a drum frame.

FIG. 9 illustrates a pair of upper brackets of a motor assembly.

FIG. 10A shows a front isometric view of an angle adjustment mechanism.

FIG. 10B shows a rear isometric view of an angle adjustment mechanism.

FIG. 12A shows a front view of a seasoning drum system in a vertical position.

FIG. 12B shows a side profile view of a seasoning drum system in a vertical position.

FIG. 13A shows a front view of a seasoning drum system in an angled orientation.

FIG. 13B shows a side profile view of a seasoning drum system in an angled orientation.

The figures are shown approximately to scale although other relative dimensions may be used.

Figure 15:
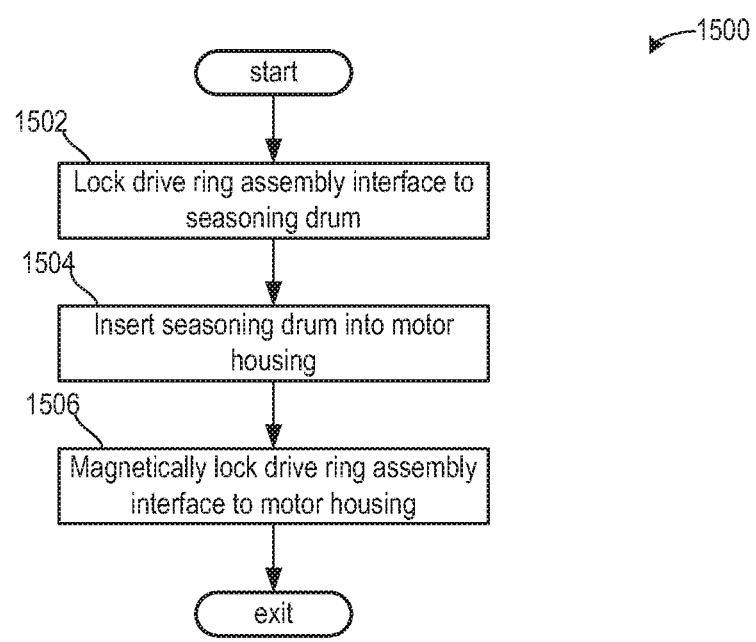

FIG. 15 shows a method for assembling the on-machine seasoning drum.

DETAILED DESCRIPTION

Figure 1:
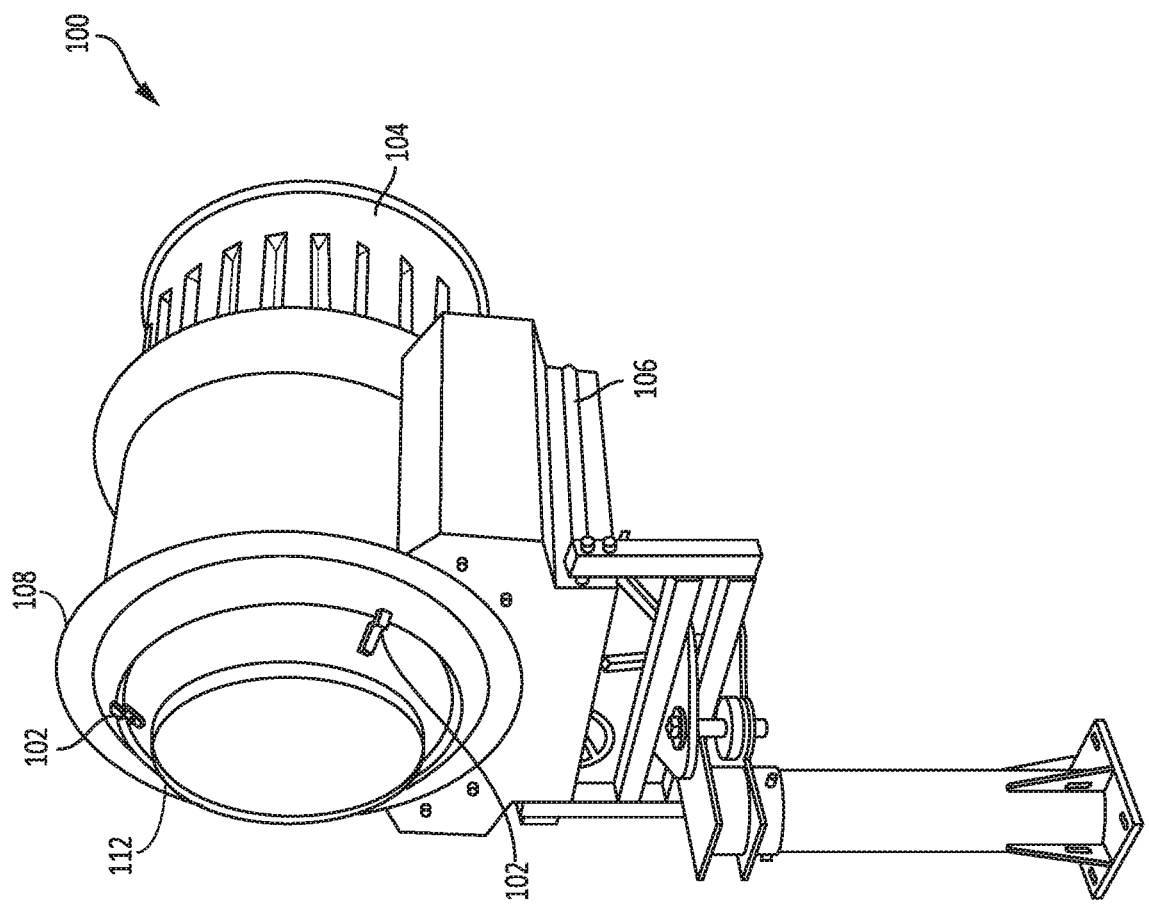
FIG. 1 shows a seasoning drum in accordance with a configuration that does not include a magnetic coupler.
Figure 2:
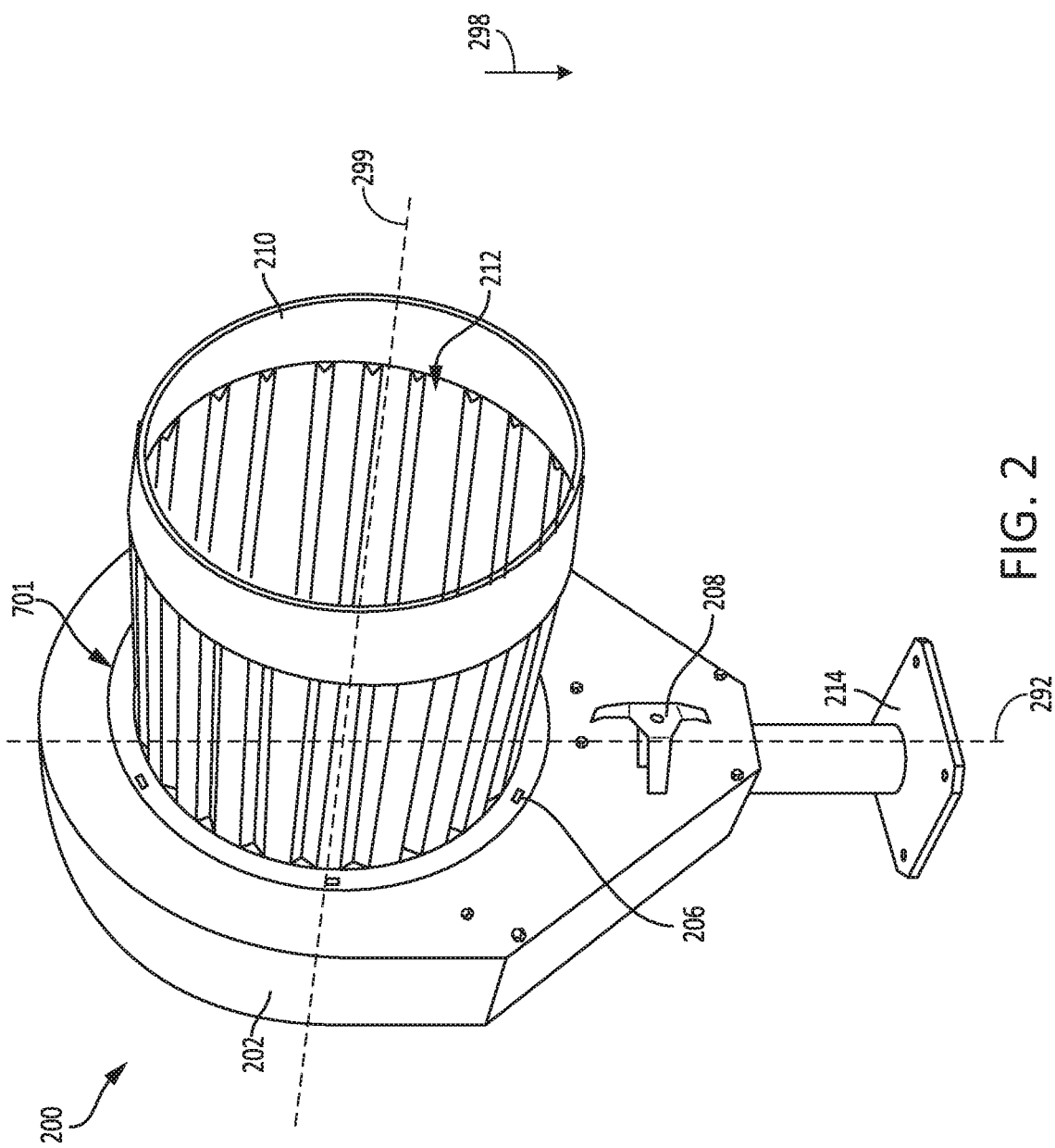
FIG. 2 shows an on-machine seasoning drum embodiment in accordance with the present disclosure.
Figure 6:
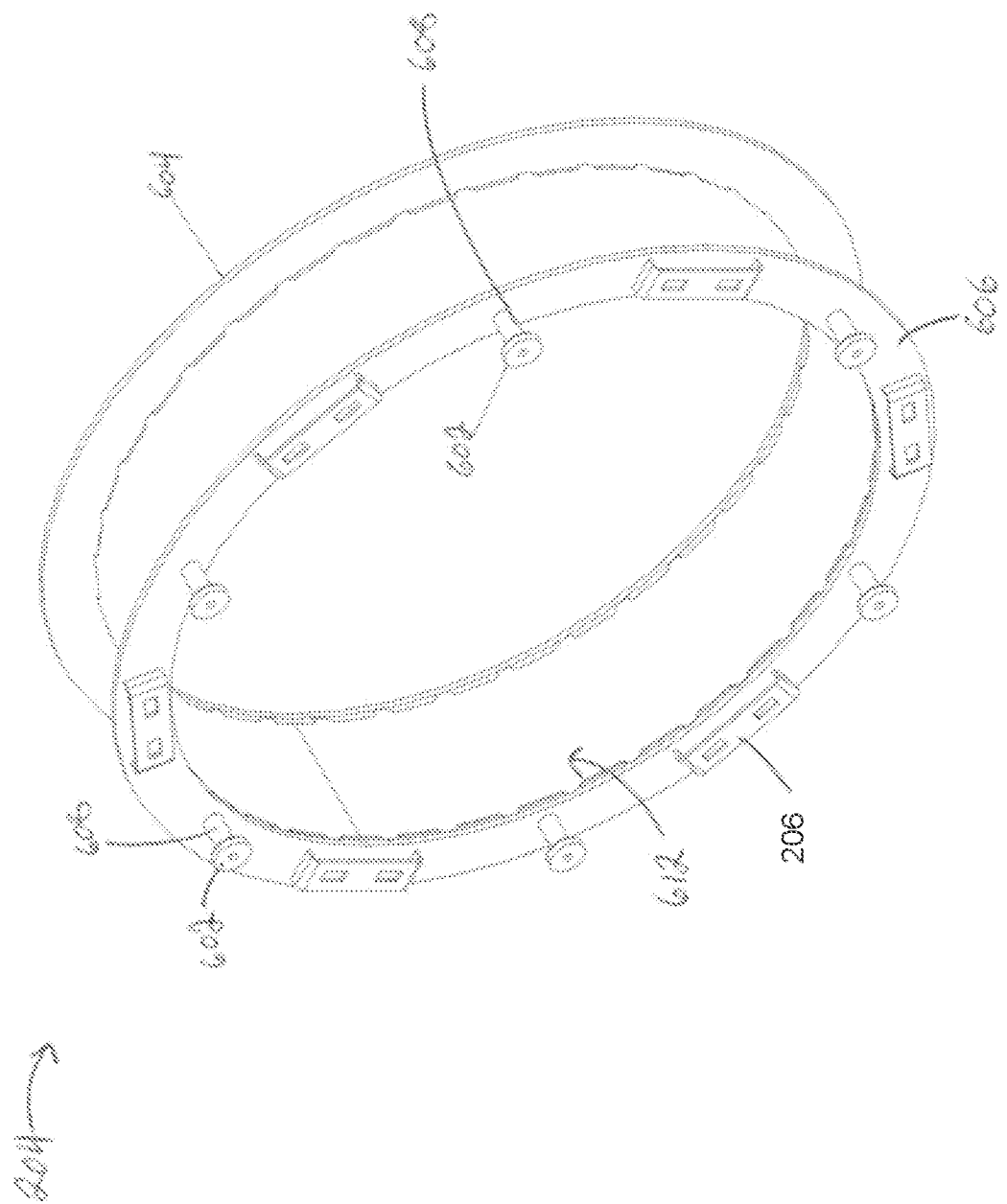
FIG. 6 shows a drive ring assembly of the on-machine seasoning drum system.
Figure 7B:
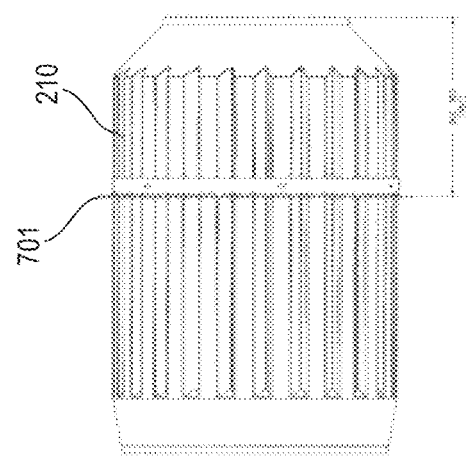
FIG. 7B shows a side profile view of a portion of the drive ring assembly coupled to a seasoning drum.
Figure 7A:
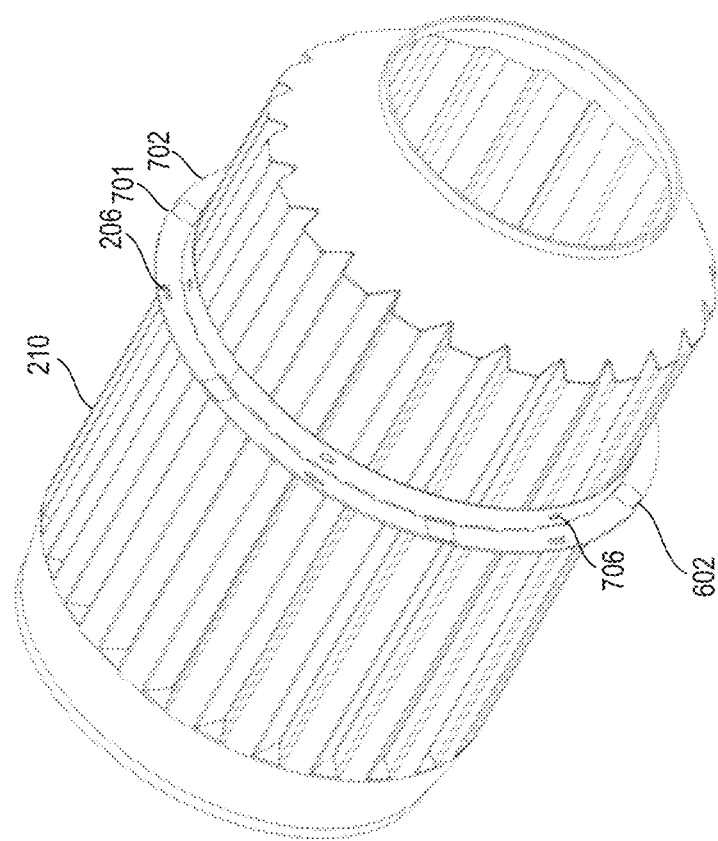
FIG. 7A shows a rear isometric view of a portion of the drive ring assembly coupled to the seasoning drum of the on-machine seasoning drum system.
Figure 8:
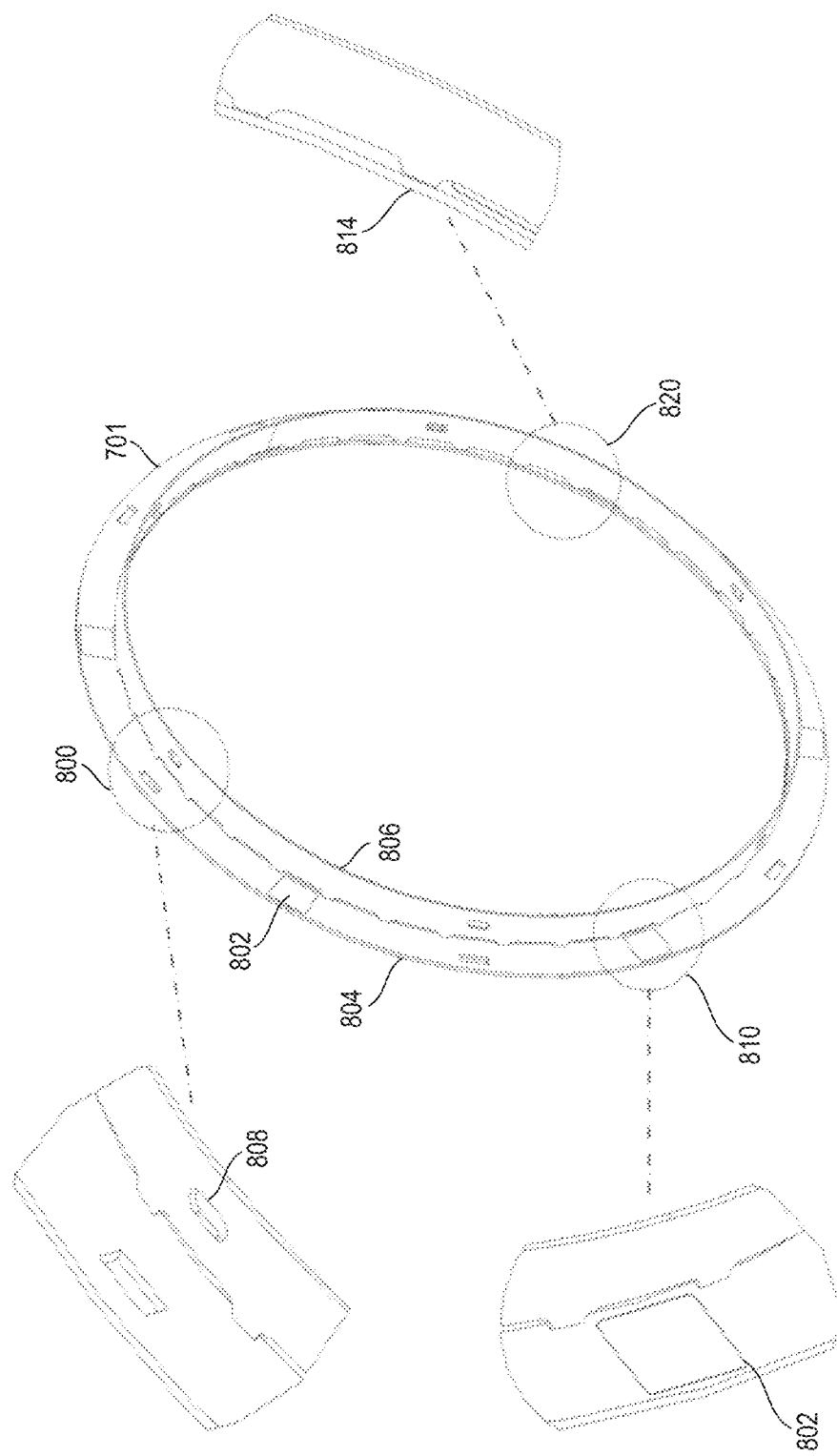
FIG. 8 provides a detailed view of one embodiment of a drive ring assembly.
Figure 11:
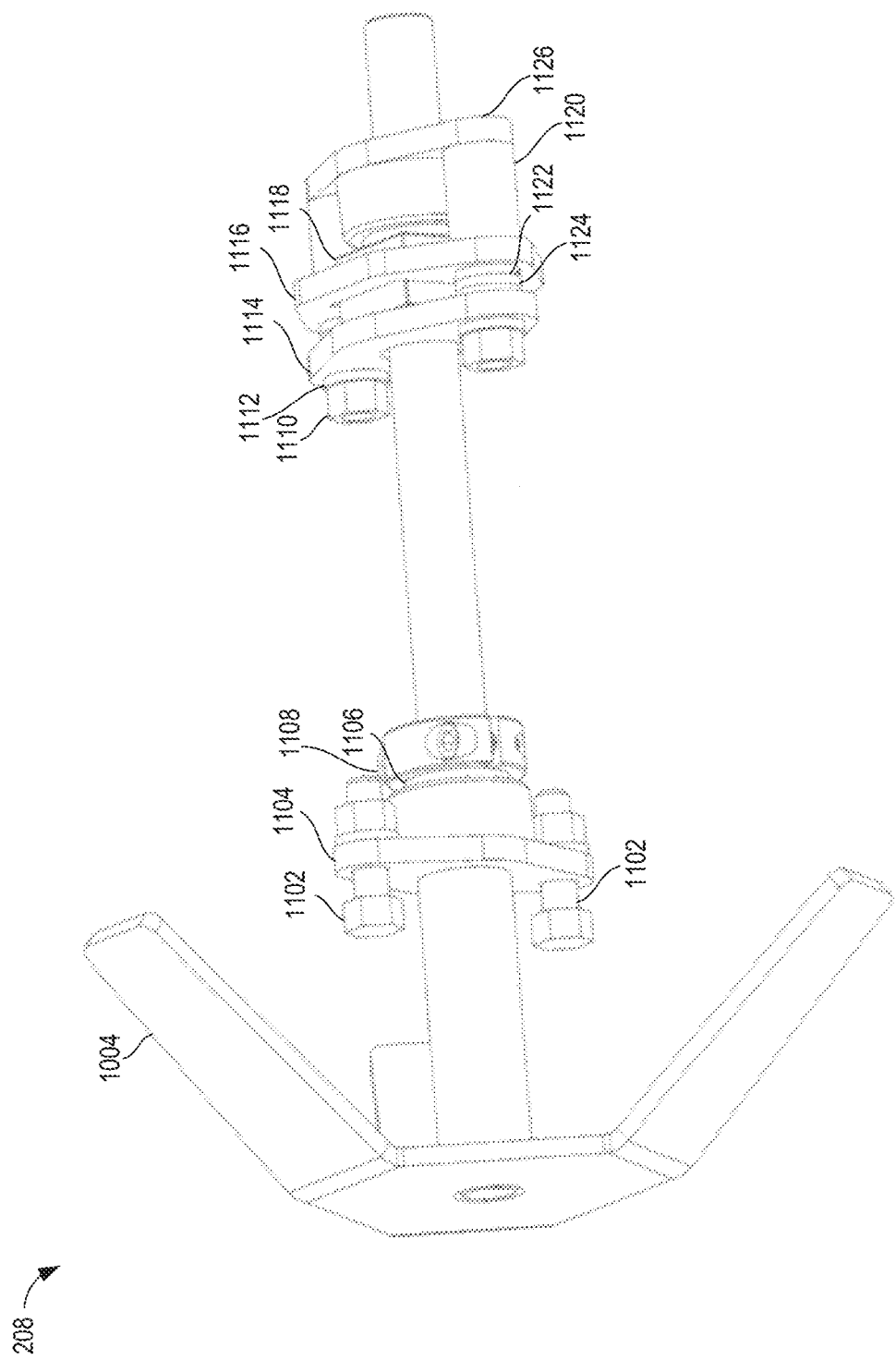
FIG. 11 illustrates an angle adjustment mechanism comprising locking members.
Figure 14:
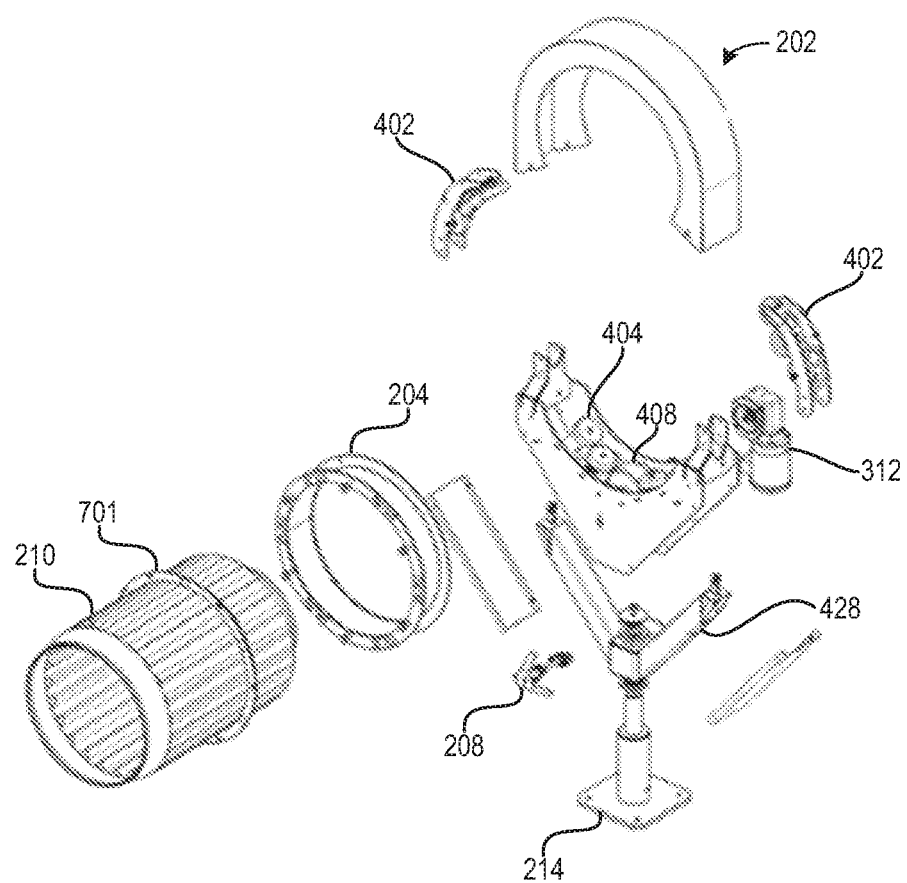
FIG. 14 is an exploded view of a seasoning drum system according to the present disclosure.

FIG. 1 shows a seasoning drum currently used which may benefit from the configuration of an on-machine seasoning drum disclosed herein. FIG. 2 illustrates an on-machine seasoning drum system which comprises a magnetic coupler in the form of a plurality of magnets that selectively retain the seasoning drum within a motor of the seasoning drum system. It will be appreciated that a magnetic coupler may include individual magnets, a plurality of magnets, or magnetized materials. Additional views of the on-machine seasoning drum system are provided in FIGS. 3A and 3B which further illustrate a method of removing the seasoning drum. The internal motor components are illustrated in FIGS. 4A, 4B, and 4C which also illustrate a locking feature for the seasoning drum system which may be used to adjust the angle of the drum for example. The seasoning drum itself may be selectively retained within the motor components of the seasoning drum system as illustrated in FIGS. 4A, 4B, and 4C via a drive ring assembly. An exemplary drive ring assembly is provided in FIGS. 5A, 5B, and 5C. The coupling of the drive ring element(s) to the seasoning drum is illustrated in FIG. 6. A rear perspective view of the seasoning drum is shown in FIG. 7A. A side perspective view is shown in FIG. 7B. A detailed view of the drive ring assembly is shown in FIG. 8. FIG. 9 shows a detailed view of upper brackets. FIGS. 10A, 10B, and 11 show detailed views of an angle adjustment mechanism. FIGS. 12A and 12B show a home position of the seasoning drum and motor housing. FIGS. 13A and 13B show an angled position, different than the home position, of the seasoning drum and motor housing. FIG. 14 shows an exploded view of the components of the seasoning drum system. FIG. 15 shows a method for assembling the on-machine seasoning drum.

FIGS. 2-14 show example configurations of the current invention with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following description concerns different embodiments of a device for seasoning food products and methods related to using such a device. Specifically, the present disclosure is directed toward an on-machine seasoning drum which utilizes magnetic retention forces to selectively retain a tumbling drum within an interior of a motor component. In this way, the tumbling drum component of the on-machine seasoning drum system may be easily removed while avoiding unnecessary and/or prolonged production downtime.

In an effort to reduce production downtime, seasoning drums may be provided with drum liners which may be swapped more easily and/or quickly relative to removing/replacing the entire drum. Further, users of seasoning drum systems may have a spare drum liner or drum liner assembly on hand such that one drum liner may be removed or sanitized and another clean drum liner may be inserted for example. However, the seasoning drum system comprising a magnetic coupler may further reduce potential downtime in that the coupling and uncoupling of the drum to the motor and/or motor housing may be performed with a single motion as opposed to using a plurality of tools and mechanically uncoupling a plurality of non-magnetic couplers such as screws for example.

It will be appreciated that as used herein, an on-machine seasoning drum may comprise a seasoning drum which may feed directly into a weigh scale or another piece of food preparation equipment in a production line for example. However, it will be further appreciated that the seasoning drum system may also be used in systems other than on-machine seasoning and/or not be directly or otherwise coupled to another piece of equipment.

Turning to FIG. 1, a known seasoning drum system 100 is illustrated. As shown in this figure, the drum 104 itself is retained by a set of thin metal brackets 102 that attach the drum to an exterior surface of a motor or motor housing 106. For example, the brackets 102 may attach a drum or drum liner to a drum ring or a housing. The housing or ring may then be attached to the motor housing 106. In this way, a unitary seasoning drum system may be provided. This specific configuration and method of retaining the tumbling drum may provide a number of drawbacks such as increased off-axis vibration and/or rotation. For example, when in operation, a seasoning drum may be incorporated into a production line which utilizes a multitude of other types of machinery such as a vibrating conveyor or other such conveyors. Conveyor systems produce their own motion which may be in a direction opposing the motion provided by the motor of the seasoning drum. When there are opposing forces, the drum may begin to rattle and shake which may damage the food products and may further affect overall customer quality.

Additionally, the mechanical attachment of the drum to a motor may further complicate removal and cleaning of the drum. For example, in order to remove the drum from the motor, a user may uncouple the plurality of brackets which may be secured via screws. Additionally, the drum may be constructed from a durable material and may comprise a large diameter such that removal of the drum may require multiple users or such that a ladder may be needed to access the screws.

Furthermore, as shown in the FIG. 1, the drum 104 extends entirely through the motor housing 106 such that an extreme end 112 of the drum protrudes through an extreme end 108 of the motor housing 106. The extreme ends 112 and 108 may be physically coupled via the brackets 102 on exterior surfaces of the motor housing 106 and the drum 104. This allows a user to access the brackets 102 without reaching inside the drum 104. However, since the drum 104 may need to be longer than the motor housing 106, a weight of the drum 104 is increased relative to a shorter drum (e.g., a drum shorter than a motor housing as will be described below). Thus, one or more users (e.g., repair-people or the like) may be needed to remove (e.g., pull) the drum 104 from the motor housing 106. This may be cumbersome and lead to decreased efficiency of manufacturing of materials.

As one exemplary embodiment of the present disclosure, an on-machine seasoning drum system 200 is illustrated in FIG. 2. The seasoning drum system 200 may comprise a motor housing 202 which may comprise an internally disposed motor that imparts rotational motion to a seasoning drum 210. The seasoning drum system 200 may further comprise a drive ring assembly interface 701 which may include a plurality of tool slots 206 which may further aide in removal of the seasoning drum 210 from the motor housing 202. The motor housing 202 may further comprise an angle adjustment member 208 which may be used to alter the angle of the seasoning drum. Further, the seasoning drum system 200 may comprise a pedestal 214 which may be used to mount the seasoning drum system 200 onto a piece of machinery or to secure the system to a surface. In one example, the pedestal 214 comprises couplings to fixedly arrange the seasoning drum system 200 to a base (e.g., a ground). Fixedly arrange may include the pedestal 214 being immovable such that when motor housing 202 is rotating the seasoning drum 210, the pedestal may be substantially stationary.

The motor housing 202 may substantially comprise the body of the seasoning drum system 200 and may house a plurality of inner working components such as the motor. The housing 202 may comprise substantially circular and/or curved top surface relative to a bottom pedestal support 214. It will be appreciated that the motor housing 202 may comprise other shapes along its top surface, for example, linear, undulated, and the like. The housing 202 may further comprise a substantially trapezoidal shaped bottom surface onto which the pedestal support 214 may be affixed. By providing a flat bottom surface, the pedestal support 214 may be more securely affixed to the motor housing. This may include locking the pedestal support 214 into a ground or some other surface via one or more fasteners such that a bottom surface of the pedestal support 214 relative to gravity 298 is in face-sharing contact with the ground or some other surface.

An angle adjustment 208 member may be disposed onto one exterior face of the motor housing 202 and may further be located on a bottom, substantially trapezoidal surface of the motor housing. The angle adjustment 208 may be below the seasoning drum 210. In one example, the angle adjustment 208 is directly below and vertically lower than the seasoning drum 210 such that the seasoning drum 210 eclipses the angle adjustment 208 from a top-down view. The angle adjustment 208 may comprise a substantially hexagonal shape with a plurality of rectangular projections extending from a center of the hexagonal shape. The angle adjustment 208 may further comprise a rod-like projection extending from a rear face of the angle adjustment 208. A rod-like projection of the angle adjustment 208 may at least partially traverse the motor housing 202 and interact with a component within the interior of the motor housing 202 that facilitates angular adjustment. In some embodiments, the rectangular projections of the angle adjustment 208 may serve as handles for a user to rotate and/or turn the angle adjustment 208 clockwise or counterclockwise. By actuating the angle adjustment 208, an orientation of the seasoning drum 210 may be adjusted. Adjusting the orientation of the seasoning drum 210 may include reorienting the central axis 299 of the seasoning drum 210 relative to a vertical axis 292 of the motor housing 202 such that the central axis 299 and the vertical axis 292 are no longer perpendicular to one another. This may include actuating the seasoning drum 210 upward along a vertical direction away from the pedestal support 214 or downward against the vertical direction toward the pedestal support 214.

Said another way, the pedestal support 214 may be disposed onto a substantially flat and/or planar bottom surface of the motor housing 202. The pedestal 214 may be used to anchor the seasoning drum system to a surface such as a floor for example, or may be used to secure or affix the seasoning drum system to another piece of food production equipment.

The motor housing may be configured in at least one example to selectively retain the seasoning drum 210 via a drive ring assembly interface 701. The drive ring assembly interface 701 may further comprise one or more tool slots 206 which may be disposed on a front facing surface of the ring-shaped member as illustrated in FIG. 2. The tool slots 206 may correspond to a detachment tool having a shape configured to mate with each of the tool slots 206, which may be supplied in at least one exemplary embodiment. The drive ring assembly interface 701 may be in direct face-sharing contact with a seasoning drum 210 and the motor housing 202 in at least one embodiment. Specifically, the drive ring assembly interface 701 is arranged directly between the motor housing 202 and the seasoning drum 210. In this way, the motor housing 202 and the seasoning drum 210 do not come in direct physical contact, in one example. Additionally or alternatively, the drive ring assembly interface 701 may be between only a portion of the motor housing 202 and the seasoning drum 210 such that a portion of the seasoning drum 210 may be in direct contact with a portion of the motor housing 202.

Additionally, the drive ring assembly interface 701 may comprise a plurality of magnets that may act to magnetically retain the seasoning drum 210 within an interior of the motor housing 202. It will be appreciated that as described and illustrated in the figures, the drive ring assembly may comprise a plurality of magnets, however, other magnet configurations are contemplated herein. For example, a single magnet may be used, or the drive ring assembly interface 701 may be magnetized and the seasoning drum may be constructed from a magnetically attractive material such as magnetic steel in one embodiment. Further, it will be appreciated that the strength, size, shape, and polarity of the magnets and/or magnetic components described herein may be varied such that a wide applicability of the on-machine seasoning drum system may be provided. In one example, the magnetic coupling may allow each of the seasoning drum 210, the drive ring assembly interface 701, and the motor housing 202 to rotate in unison.

A seasoning drum 210 member of the seasoning drum system 200 may comprise a plurality of inward projections or ledges 212 disposed within an interior of the seasoning drum. In at least one example embodiment, the ledges 212 defined by the inward projections of the seasoning drum may serve to catch and retain food products during the seasoning process. By providing a series of ledges on the interior of the drum, the seasoning may be more evenly applied to all food products within the drum. The ledges 212 extend in a radially inward direction toward the central axis 299 of the drum.

FIGS. 3A and 3B provide isometric illustrations of a front facing view 300 and a rear facing view 350 of the seasoning drum system 200, respectively. With respect to FIG. 3A, this figure illustrates a front facing view of one exemplary embodiment of an on-machine seasoning drum. The front surface 304 may further comprise a small hook 314 on an exterior face. The hook 314 may be configured to selectively retain a detachment tool 302 which may aid in removal of the seasoning drum 210 from the motor housing 202. In the front facing view 300, a first extreme end 320 of the seasoning drum 210 is shown. In the rear facing view 350, a second extreme end 322 of the seasoning drum is shown. The drive ring assembly interface 701 is biased toward the second extreme end 322 such that a distance between the first extreme end 320 and the motor housing 202 is greater than a distance between the second extreme end 322 and the motor housing 202.

The detachment tool 302 may comprise a substantially rectangular shape and may further comprise an elevational change 316 at one end of the tool. Specifically, the elevational change 316 may be a bend and/or some other deviation from linear. Additionally, the tool 302 may include a rectangular projection at the same end of the tool that may feature the elevational change 316. The rectangular projection may be thinner than the remainder of the tool itself and may be configured to fit into the one or more tool slots 206 which may be disposed on a front facing surface of the drive ring assembly interface 701 as shown in coupling position 360.

The tool 302 may additionally comprise a hole 318 at an end opposite that of the rectangular projection and the elevational change 316. The hole 318 may serve to retain the tool onto the hook 314 which may be disposed on a front-facing surface of the motor housing 202 as shown in resting position 362.

Said another way, the tool 302 may be inserted into at least one of the tool slots 206, thereby coupling the tool 302 to the drive ring assembly interface 701. By coupling the tool 302 to the drive ring assembly interface 701, the tool 302 may be actuated to adjust the magnetic coupling corresponding to the motor housing 202, the drive ring assembly interface 701, and the seasoning drum 210. For example, when in the coupling position 360, the tool 302 may be actuated in a downward direction toward the pedestal support 214. If a threshold force is applied to the tool 302, where the threshold force is greater than a coupling force of the magnetic coupling system, then the seasoning drum 210 may be released from the drive ring assembly interface 701. This may allow the seasoning drum 210 to be removed from the seasoning drum system 200. In some examples, the tool 302 may be actuated in a vertical direction or a radially outward direction away from the seasoning drum 210 without departing from the scope of the present disclosure.

In some examples, the seasoning drum 210 may not decouple from the drive ring assembly interface 701 without coupling the tool 302 to the drive ring assembly interface 701. In this way, the seasoning drum 210 may not be decoupled due to forces generated during actuation (e.g., rotation) of the seasoning drum 210. Said another way, the magnetic forces coupling the drive ring assembly interface 701 to the seasoning drum are sufficiently powerful to maintain coupling during rotation of the seasoning drum 210 with food arranged therein. The tool 302 may be used when the seasoning drum 210 is not being rotated and a user desired to one or more of clean the seasoning drum 210, access one or more components of the drive ring assembly interface 701, and the like.

Turning now to FIG. 3B, this figure shows a rear facing surface 306 of the seasoning drum system 200. As illustrated in this figure, the motor housing 202 may comprise a gearbox 312 disposed on an exterior surface of the rear facing surface 306 of the motor housing 202 opposite the angle adjustment 208. The gearbox may be used to provide rotational motion to the seasoning drum. Although the gearbox is illustrated on an exterior surface of the motor housing 202, alternative embodiments are also contemplated herein. For example, in at least one embodiment, the gearbox may be internally disposed within the motor housing.

Additionally, in FIG. 3B, it can be seen that the seasoning drum may fully traverse the motor housing 202 in at least one embodiment. The pedestal support 214 of the seasoning drum system may further comprise multiple components such as a base plate 310 and a cylindrical rod 308 which may act as the junction between the base plate 310 and the motor housing 202. During operation of the seasoning drum system 200, the cylindrical rod 308 and the base plate 310 may remain stationary such that motion of one or more components of the seasoning drum system 200 is not transferred to the pedestal support 214.

Turning now to FIGS. 4A-4C, these figures illustrate the internal components of the motor housing 202. FIG. 4A illustrates the components which may be internally disposed within the motor housing 202 and may facilitate the rotational motion of the seasoning drum. The motor assembly 400 may comprise a set of upper brackets 402, a plurality of idler wheel assemblies 404, a main shaft 406, one or more drive rollers 408, a pair of mount bars 410, an angle adjustment mechanism 420, and one or more adjuster brackets 422. The motor assembly may, in at least one example, be directly coupled to a pedestal support 214.

A bottommost portion of the motor housing 202 which may be in contact with a pedestal support 214, may comprise a substantially trapezoidal shape wherein the mount bars 410 may define the non-parallel edges of the trapezoid profile. Specifically, the mount bars 410 extend in a direction angled to a vertical axis of the motor housing 202 and the pedestal support 214.

A pair of upper brackets 402 may be coupled to an upper surface of the mount bars 410 relative to a bottom surface of the motor assembly which may be in direct contact with the pedestal support 214. Further, the upper brackets 402 may comprise a curved shape and may form a curved upper surface of the motor assembly. It will be appreciated that this curvature may be covered by the motor housing which may comprise a substantially circular upper edge. The curvature may be adjusted based on a curvature and/or shape of a seasoning drum. By doing this, the seasoning drum may be situated radially interior to the upper brackets 402 while being in face sharing contact with idler wheel assemblies 404 and drive rollers 408.

The upper brackets 402 may additionally comprise one or more idler wheel assemblies 404 which may assist in providing motion to the seasoning drum. For example, in operation of the seasoning drum system, a seasoning drum may be in direct face-sharing contact with one or more drive rollers 408 which may be centrally disposed between a pair of mount bars 410. As the drive rollers 408 rotate, the idler wheel assemblies 404 may assist in providing a rotational motion by facilitating motion and reducing friction experienced by the seasoning drum as a result of being constrained between the mount bars 410 and the upper brackets 402. The seasoning drum may be rotated in a clockwise or counter-clockwise direction about its own central axis (e.g., central axis 299 of FIG. 2). By rotating the seasoning drum, objects may turn end over end in the seasoning drum such that different surfaces of an object of the objects may be exposed.

The motor assembly 200 may further comprise a main shaft 406 which may be centrally disposed between a pair of mount bars 410 in at least one embodiment. The main shaft 406 may traverse one or more drive rollers 408 and may extend outward through a rear face of the motor housing. Additionally, the main shaft 406 may be communicatively coupled to a gearbox which may be disposed on an exterior rear face of the motor housing in at least one example. In this way, the rotational motion provided by the gearbox may be supplied to the interior of the motor housing and to the motor which may then impart a rotational motion to the seasoning drum.

FIG. 4B shows a detailed close-up view of the main shaft 406, a drive roller 408 and an angle adjustment mechanism 208. It will be appreciated that the angle adjustment mechanism may also be referred to herein as a tilt adjustment mechanism or a tilt adjuster. As illustrated in FIG. 4B, a rod-like end of the angle adjustment mechanism may be in direct face-sharing contact with a drive roller 408 at a bottom edge. As described above, by actuating the angle adjustment mechanism 208, the orientation of the motor housing and the seasoning drum may be adjusted such that a direction of an output of the seasoning drum is modified. This allows the motor housing and seasoning drum to be used with various other assemblies and conveyors (e.g., weigh station, packaging station, belt conveyor, and the like).

With respect to FIG. 4C, a detailed view of the internal workings of the motor assembly which may facilitate a variable orientation. For example, adjustment such as turning of the angle adjustment mechanism may result in movement of one or more plates 428 within the motor assembly which may be communicatively coupled to a rod 426. The rod may them move over a range of distances as illustrated by reference numeral 430. There may further exist a spacer 424 which may allow for a predetermined range of motion along an opposing axis.

Turning now to FIGS. 5A-5C, these figures provide different views of a drum frame. The motor housing a bottommost portion that may comprise a substantially trapezoidal profile, wherein one of the parallel edges of the shape comprises a substantially semicircular indention. It will be appreciated that the semicircular indention may serve as a support surface for a seasoning drum in at least one example.

In FIG. 5A a front isometric view of the motor housing 202 is provided. In this view, it may be seen that the motor housing may comprise one or more hooks 504 which may be used to hang the detachment tool which may be used for removal of the seasoning drum from within the motor housing.

The motor housing 202 may comprise a front plate 508 and a rear plate 525 and a middle body 506 therebetween. The front plate and the rear plate may further be in direct contact with one or more idler brackets 526, 528. The idler brackets may be fixedly coupled to the front and rear plates of the motor housing via a fillet weld, which engages with slots 510 on the front plate 508 and the rear plate 525, for example, although other couplers and/or coupling methods may be used. In at least one example, the motor housing may be selectively coupled to a pair mount bars as illustrated in FIG. 4A via a coupling mechanism 502 such as a nut and bolt.

With respect to FIG. 5B, this figure illustrates the coupling nature of the one or more idler brackets 526, 528 to the front and rear plates of the drum frame. A small hole 530 may be disposed into a region of the front plate such that a rod end of the angle adjustment mechanism may be inserted through said hole 530. Further, the idler brackets may, in at least one embodiment, be communicatively connected to the angle adjustment mechanism.

Turning now to FIG. 5C, a rear isometric view is presented. In this view, a pair of angle tabs 512, 516 are shown. The angle tabs 512, 516 may be physically coupled to an inner bracket 518 at an interface 514. However, in alternative embodiments, the angle tabs and the inner bracket may be integrally constructed from a single piece of material. An adjuster tab 520 may further be included within an internal region of the motor housing and may transfer motion provided by the angle adjustment mechanism to the drum frame.

A rear plate 525 of the motor housing may include a centrally disposed hole which may be larger than a hole 530 on the front plate 508. The rear hole may be in direct face-sharing contact with a drive mechanism such as a gearbox in at least one example. One or more outer brackets 522 may additionally be included and may be coupled to the front and rear plates via a set of vertical slots 524. For example, it at least one embodiment, the outer brackets may comprise a pair of outward projections which may correspond to the shape of the vertical slots 524. Further, the tabs may comprise different sizes dependent on their position. In this way, incorrect assembly may be avoided.

One exemplary embodiment of a drive ring assembly 204 is provided in FIG. 6. In this figure, it may be seen that the drive ring assembly 204 may comprise two ring-shaped elements 604, 606. The two ring-shaped elements may be fixedly attached to one another via a planar ring joining member 612. In one example, one ring-shaped element may comprise a front-facing surface, and another ring-shaped element may comprise a rear-facing surface.

In at least one embodiment, a front-facing ring 606 may further comprise a plurality of release brackets which may be used to aide in removal of the seasoning drum from the motor housing. For example, the detachment tool may be inserted into the slots present on an exterior front-facing surface of the motor housing. The tool may then extend inward and traverse the slots 206 of the release bracket. At this point, the detachment tool may then be used as a pry-bar to loosen and release the seasoning drum. This may allow a user to overcome a force of the magnets connecting the drive ring assembly 204 to the seasoning drum.

The front-facing ring 606 may additionally comprise a plurality of magnet mounts 608 and a plurality of magnets 602. In one example, the magnets 602 may comprise grade N42 NdFeB magnets although other types of magnets may be used depending on the needs of a user. The magnets may further comprise an axial magnetization direction and may comprise a pull force of between 33 and 113 pounds for example. It will be appreciated however, that the type of magnets, their magnetization direction, their shape, etc., may be varied to accommodate different working conditions. For example, the pull force of the magnets may be increased as an amount of food needed to be conveyed, tumbled, and/or seasoning in the seasoning drum is increased.

As shown, the magnets 602 are segmented and located around a circumference of the drive ring assembly 204. Each magnet of the magnets 602 may be equally spaced apart from one another. Each magnet may be substantially identical to each of the other magnets.

In one example, a force of the magnets 602 is parallel to a central axis of the seasoning drum. Said another way, the force of the magnets 602 is directed in a direction perpendicular to gravity. As such, the magnets 602 may cantilever the seasoning drum to the motor housing, wherein a portion of the seasoning drum is freely extending outside of the motor housing without touching the motor housing.

In FIG. 7A, a rear isometric view of the seasoning drum coupled to the drive ring assembly interface 701 is shown. As shown in the figure, the seasoning drum 210 may be in direct face-sharing contact with a bottommost planar surface of the drive ring assembly interface 701. In some embodiments, the drive ring assembly interface 701 may be coupled to the seasoning drum using coupling mechanisms 702 such as bolts and lock washers. For example, the drive ring assembly interface 701 may comprise a plurality of grooves which may be used to insert coupling mechanisms to retain the seasoning drum. It will be appreciated however, that in other embodiments, the ring may be secured to the seasoning drum by other methods such as frictional retention, tension bands, or any other suitable method of attachment.

The magnets 602 may be arranged outside of the seasoning drum 210. Each slot of the slots 206 are arranged between each magnet of the magnets 602. As such, the tool 302 may be inserted into a slot of the slots 206 between two or more magnets 602. The coupling mechanisms 702 may further comprise alignment slots 706 on an inner, magnetic ring.

A side profile isometric view of an example seasoning drum is shown in FIG. 7B. As shown in the figures, the drive ring assembly interface 701 is positioned at a distance roughly ¾ of the length of the drum. It will be appreciated that the placement of the drive ring assembly interface 701 relative to the seasoning drum may be variable and may further be adjustable to account for variations in production methods for example. By doing this, a small portion of the seasoning drum may traverse an entire length of the motor housing.

In the example of FIGS. 7A and 7B, the drive ring assembly is physically coupled to the seasoning drum and the magnets of the drive ring assembly may couple to magnetic materials of the motor housing so that the seasoning drum may be actuated by the motor housing. In some examples, additionally or alternatively, the drive ring assembly 204 may be fastened to surfaces of the motor housing such that the magnets of the drive ring assembly may magnetically couple to magnetic portions of the seasoning drum.

A detailed and partially exploded view of the drive ring assembly is illustrated in FIG. 8. As one example of a drive ring assembly interface 701, the ring may comprise a substantially circular shape having a planar surface 806 which may contact a seasoning drum directly in a face-sharing manner. The drive ring assembly interface 701 may further comprise a vertical projection 804 that may be substantially perpendicular to the planar surface. The vertical projection 804 may be in face-sharing contact with a surface of the motor housing when the drum assembly is fully coupled. Similarly the planar surface 806 may be in face-sharing contact when the drive ring assembly interface 701 is physically coupled to and locked with an exterior surface of the seasoning drum.

Said another way, the drive ring assembly interface 701 comprises an L-shape having a first surface (e.g., the planar surface 806) and a second surface (e.g., the vertical projection) perpendicular to one another. The first surface is configured to physically couple to an exterior surface of the seasoning drum and the second surface is configured to magnetically lock to an exterior surface of the motor housing. The second surface may be flush with the exterior surface of the motor housing when the food preparation system is fully assembled such that the first surface may extend directly below a surface of an opening of the motor housing through which the seasoning drum extends.

The drive ring assembly interface 701 may further comprise one or more magnetic target pads 802. In one example, the magnetic target pads 802 may be used substantially similarly to magnets 602 of FIG. 6. The magnetic target pads may comprise magnets or may be constructed of a magnetic material such as magnetic steel. In this way, the drive ring assembly 204 may be magnetically coupled to magnetic surfaces of the motor housing. Detail view 800 illustrates the holes 808 which may allow for retention of the seasoning drum via coupling mechanisms such as nuts and bolts.

Detailed view 810 provides a closer view of the magnetic target pads which may be disposed on a surface of the vertical projection 804. In at least one example embodiment, the magnetic target pads may be welded around each side, although other methods of attachment are contemplated herein. Further, the magnetic target pads may be substantially flush with the surface of the drive ring assembly interface. In detail view 820, a close up view illustrates an embodiment which may comprise a plurality of weld junctions at which the two perpendicular surfaces may be attached. It will be appreciated that in at least one embodiment, the two perpendicular surfaces may be integrally formed.

Turning to FIG. 9, this figure illustrates a pair of upper brackets. The pair of upper brackets may be secured to a pair of mounting bars as illustrated in the prior figures and may further serve to constrain the seasoning drum between the two brackets. Each bracket may comprise one or more idler brackets 902, a pair of side plates 906, and an upper bracket cross brace 910, wherein the upper bracket cross brace 910 is welded to the pair of side plates 906 at contact points 908. The embodiment of FIG. 9 may be used substantially similarly to corresponding portions (e.g., mounting bracket 402) of FIG. 4A.

The one or more idler brackets may comprise one or more interlock tabs 903 which may communicate with one or more notches present on interior faces of the side plates 906. The idler brackets may provide a mounting surface for the idler wheels which may be present within the motor assembly of the on-machine seasoning drum system. Further, the one or more idler plates 902 may be welded 904 to the side plates 906 although other methods of attachment are contemplated herein. Additionally, it will be appreciated that the upper brackets may be constructed from a single, unitary piece, such that all components of the bracket are integral. In at least one embodiment, the upper brackets may comprise one or more cross braces 910. Each cross brace of the cross braces 910 may provide additional structural support which may in turn, offer improved and more consistent rotational motion.

With respect to FIG. 10A, the angle adjustment mechanism assembly 208 is shown. The angle or tilt adjustment mechanism may comprise a substantially hexagonal profile, wherein there may extend three rectangular projections 1004 protruding from alternating edges of the hexagonal shape. The adjustment mechanism may include a shaft 1002 which may traverse the motor housing. The shaft of the adjustment mechanism may further be in communicative connection with components internally disposed within the motor housing which may operate an angular adjustment process.

The angle adjustment mechanism may further comprise a sleeve 1006 which may be fixedly coupled to the shaft 1002 and the hexagonal surface of the adjustment mechanism via a fillet weld 1008. The coupling 1001 may comprise a weld such as a rosette weld or any other suitable method of attachment.

In FIG. 10B, a rear isometric view of the angle adjustment mechanism is illustrated. In this view, a junction 1010 between the hexagonal surface and the shaft end is visible. In some embodiments the junction 1010 may comprise a weld junction although other methods of joining such as adhesives may also be used. Similarly, the sleeve 1006 may be fixedly coupled to the shaft 1002 and the hexagonal face.

The angle adjustment mechanism may further interact with components internally disposed within a motor housing as illustrated in FIG. 11. In this figure, a side profile view of an exemplary angle adjustment mechanism coupled to internal components of the motor assembly is provided. As one example, bolts or other fastening devices 1102 may be used to secure a bearing 1104 to the shaft of the angle adjustment mechanism.

The bearing 1104 may comprise a substantially diamond shaped profile and may comprise rounded corners although other shapes and orientations may be possible. The bearing 1104 may be in direct face-sharing contact with at least a surface of the shaft. Additionally, a spacer 1106 may be used to keep a predetermined level of distance from a collar 1108 element. The collar 1108 may serve to keep the bearing in a specific place for example.

At a rear end of the adjustment mechanism's shaft, there may be an anti-rotation plate 1116 which may be in direct face-sharing contact with at least a surface of the shaft and a nut 1118. The anti-rotation plate 1116 may be physically coupled to a nut retention plate 1114. The nut retention plate 1114 and the anti-rotation plate may be physically coupled to one another via a coupling mechanism such as a lock washer 1112 and a nut 1110, although other coupling mechanisms may be used. The nut retention plate 1114 and the anti-rotation plate 1116 may be spaced away from one another via outer washers 1122 and middle washer 1124.

The angle adjustment mechanism may further comprise a rear plate 1126 which may define an interface between the adjustment mechanism and the drum frame. For example, the motor housing may be welded to a rear plate 1126 although other methods of attachment may be used. The rear plate 1126 is spaced away from the anti-rotation plate 1116 via spacers 1120.

Turning now to FIGS. 12A-12B and 13A-13B, FIGS. 12A and 12B show frontal and side profile views, respectively, of an exemplary on-machine seasoning drum system according to the present disclosure. The vertical position may be referred to as a "home" position. It will be appreciated however, that the angle of the drum may be adjusted via the angle adjustment mechanism 208. In the home position, the central axis 299 of the seasoning drum 210 is parallel to a horizontal axis 1299 of a surface to which the pedestal support 214 is coupled. Additionally, the vertical axis 292 is perpendicular to the horizontal axis 1299.

FIGS. 13A and 13B show a frontal and side profile view, respectively, of an on-machine seasoning drum system in accordance with the present disclosure in an angled orientation. It will be appreciated that the drum may be adjustable over a predetermined range of angles and may be adjustable via the angle adjustment mechanism 208. In the angled orientation, the central axis 299 is no longer parallel to the horizontal axis 1299. An angle α is formed between the central axis 299 and the horizontal axis 1299, where the angle α may be between 5-60 degrees. Additionally, the vertical axis 292 is no longer perpendicular to the horizontal axis 1299. An angle Θ may be formed between the vertical axis 292 and the horizontal axis 1299, where the angle Θ may be between 30-85 degrees.

Finally, FIG. 14 illustrates an exploded view of the components described in detail above with reference to FIGS. 2-13B. As illustrated in this figure, a seasoning drum may be physically coupled to a drum ring mount which may further be releasably and/or magnetically coupled to a drive ring assembly. The seasoning drum and drive ring assembly may then be releasably coupled to the motor assembly. The motor assembly may be enclosed by a motor housing.

Turning now to FIG. 15, it shows a method 1500 for assembling an on-machine seasoning drum system. In one example, the on-machine seasoning drum system and the components described herein may be used substantially similarly to the on-machine seasoning drum system 200 and its corresponding components (e.g., motor housing 202, drive ring assembly 204, and seasoning drum 210), respectively.

The method 1500 begins at 1502, where the method may include locking the drive ring assembly interface to the seasoning drum. This may include placing the drive ring assembly interface around an exterior surface of the seasoning drum and locking one or more fasteners to the exterior surface. In one example, the drive ring assembly interface is biased toward one or two extreme ends of the seasoning drum. Alternatively, the drive ring assembly interface may be arranged directly in the middle of the two extreme ends.

The method 1500 may proceed to 1504 where the method includes inserting the seasoning drum into the motor housing. The inserting may occur until the seasoning drum has completely traversed a length of the motor housing. When the seasoning drum is fully inserted into the motor housing, both of its extreme ends are outside of and on opposite sides of the motor housing. In one example, a length of a portion of the seasoning drum arranged outside of the motor housing at a first side is longer than a length of a remaining portion of the seasoning drum arranged outside of the motor housing at a second side. The seasoning drum and the motor housing do not physically couple directly to one another, however, rollers and the like of the motor housing may be in contact with exterior surfaces of the seasoning drum.

The method 1500 may proceed to 1506 where the method includes magnetically locking the drive ring assembly interface to the motor housing. Magnetically locking the drive ring assembly interface to the motor housing may include pressing the drive ring assembly interface against an exterior surface of the motor housing to which magnets of the drive ring assembly interface are attracted. In one example, the exterior surface of the motor housing comprises a plurality of magnetic pads physically coupled to the motor housing, the magnetic pads being able to magnetically lock with the magnets of the drive ring assembly interface. The magnetic pads may be further configured to rotate with a rotation of the motor housing. Additionally or alternatively, the entire exterior surface of the motor housing may be magnetically attracted to the magnets of the drive ring assembly interface. As such, when the motor housing rotates, the exterior surface of the motor housing also rotates, thereby rotating the drive ring assembly interface and the seasoning drum.

In this way, the seasoning drum may be quickly coupled to the motor housing via the plurality of magnets arranged on the drive ring assembly interface of the seasoning drum. The drive ring assembly interface is physically locked with an exterior surface of the seasoning drum and is configured to magnetically couple to an exterior surface of the motor housing. The technical effect of the using magnets to physically couple the seasoning drum to the motor housing is allow a user to easily remove the seasoning drum via a tool. The tool decouples each of the magnets from the surface of the motor housing in a single, continuous movement (e.g., a pull). By doing this, a number of components needed to decouple the seasoning drum from the motor housing is reduced and time is saved.

In another representation, the food preparation machine described above where the body comprises a motor housing, a magnetic coupler comprising a plurality of magnets, and where the machine further includes an angle adjustment mechanism and a detachment tool.

In another representation, a seasoning drum for use in a food preparation machine comprises a substantially cylindrical drum, and a plurality of ledges internally disposed within an interior of the cylindrical drum. The drum is magnetically retained in a food preparation machine that includes a drum ring mount that has one or more magnetic targets.

In another representation a method of attaching a seasoning drum for a food preparation machine comprises positioning the seasoning drum, and magnetically securing the seasoning drum into a food preparation machine. The seasoning drum further comprises a drum ring mount. A detachment tool is inserted into a slot of the drum ring mount to remove the drum from the food preparation machine.

A food preparation machine comprises a motor housing comprising a gearbox and a seasoning drum comprising a cylindrical body extending through an opening of the motor housing, the seasoning drum further comprising a drive ring assembly comprising at least a magnet configured to couple to an exterior surface of the motor housing. A first example of the food preparation machine further comprises where the magnet is a single strip, the strip extending around an entire circumference of the drive ring assembly. A second example of the food preparation machine, optionally including the first example, further comprises where the magnet is one magnet of a plurality of magnets, and where the magnets are equally spaced apart from one another around a circumference of the drive ring assembly. A third example of the food preparation machine, optionally including the first and/or second examples further comprises where the drive ring assembly comprises a circular L-shape with a planar portion being configured to physically couple to an exterior surface of the seasoning drum, the drive ring assembly further comprising a vertical portion perpendicular to the planar portion, the vertical portion comprising the magnet. A fourth example of the food preparation machine, optionally including one or more of the first through third examples, further includes where the drive ring assembly is biased toward an extreme end of the seasoning drum extending through the opening of the motor housing. A fifth example of the food preparation machine, optionally including one or more of the first through fourth examples, further includes where the seasoning drum extends through and protrudes from the opening of the motor housing. A sixth example of the food preparation machine, optionally including one or more of the first through fifth examples, further includes where the motor housing further comprises an angle adjustment device, and where the angle adjustment device adjusts an orientation of the seasoning drum and the motor housing relative to a surface to which the motor housing is coupled. A seventh example of the food preparation machine, optionally including one or more of the first through sixth examples, further includes where the seasoning drum further comprises a plurality of ledges, and where the ledges are configured to assist food tumbling within the seasoning drum. An eighth example of the food preparation machine, optionally including one or more of the first through seventh examples, further includes where the drive ring assembly further comprises one or more slots, where the slots are configured to receive a tool adapted to decouple the drive ring assembly from the motor housing.

An embodiment of a method comprises coupling a seasoning drum to a motor housing via a plurality of magnets arranged on a vertical surface of a drive ring assembly, the drive ring assembly being physically coupled to the seasoning drum via one or more fasteners extending through its planar surface. A first example of the method optionally includes where decoupling the seasoning drum from the motor housing via a tool extending through a slot of the drive ring assembly, the decoupling further comprising actuating the tool away from the seasoning drum to overcome a magnetic coupling between the plurality of magnets and a surface of the motor housing. A second example of the method, optionally including the first example, further includes where adjusting an orientation of the seasoning drum and the motor housing via an angle adjustment mechanism, and where the angle adjustment mechanism is configured to adjust an angle of the seasoning drum and the motor housing relative to an axis of a surface upon which the motor housing rests.

A conveyor assembly comprises a motor housing comprising a gearbox, the gearbox configured to rotate the motor housing, a seasoning drum comprising a plurality of ledges configured to tumble food in the seasoning drum, the seasoning drum extending through the motor housing and in face-sharing contact with one or more drive rollers of the motor housing, and a drive ring assembly comprising a first surface physically coupled to an exterior surface of the seasoning drum via one or more fasteners, the drive ring assembly further comprising a second surface perpendicular to the first surface, where the second surface comprises a plurality of magnets configured to couple to an exterior surface of the motor housing. A first example of the conveyor assembly further comprises where the drive rollers rotate the seasoning drum. A second example of the conveyor assembly, optionally including first example further comprises where the first surface is in face-sharing contact with the exterior surface of the seasoning drum and where the second surface is in face-sharing contact with the exterior surface of the motor housing when the seasoning drum is cantilevered to the motor housing. A third example of the conveyor assembly, optionally including the first and/or second examples, further includes where the drive ring assembly further comprises a plurality of slots, each slot of the plurality of slots being alternatingly arranged between the plurality of magnets on the first surface. A fourth example of the conveyor assembly, optionally including one or more of the first through third examples, further includes where the slots are configured to receive a tool, the tool configured to decouple the drive ring assembly from the motor housing. A fifth example of the conveyor assembly, optionally including one or more of the first through fourth examples, further includes where the seasoning drum comprises a first extreme end located on a first side of the motor housing and where the seasoning drum further comprises a second extreme end located on a second side of the motor housing, and where the drive ring assembly is biased toward the first side. A sixth example of the conveyor assembly, optionally including one or more of the first through fifth examples, further includes where the first surface of the drive ring assembly extends into a plane of the motor housing. A seventh example of the conveyor assembly, optionally including one or more of the first through sixth examples, further includes where the motor housing comprises magnetic steel.

The geometries, orientations, shapes, and relative dimensions have been presented and illustrated herein in simplified form. It will be appreciated that other geometries, orientations, shapes, and relative dimensions are anticipated. As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

Thus, it should be appreciated that the figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, in at least one example. As one example, components laying in face-sharing contact with each other may be referred to as in face-sharing contact. Additionally, elements positioned apart from each other with only a space there-between and no other components may be referred to as such in at least one example. Further, elements shown above/below one another, at opposite sides relative to one another, or to the left/right of one another, may be referred to as such relative to one another. As shown in the figures, a topmost element or point of an element may be referred to as a "top" of the component and a bottommost element or point of an element may be referred to as a "bottom" of the component in at least one example.

As used herein, top/bottom, upper/lower, above/below, and similar terms may be relative to a vertical axis of the figures and used to describe positioning of elements of the figures relative to one another. As such, elements shown above other elements are positioned vertically above the other elements, in one example. Further, shapes of the elements depicted within the figures may be referred to as having those shapes (e.g., such as being circular, straight, planar, curved, rounded, chamfered, angled, or the like). Elements shown intersecting one another may be referred to as intersecting elements or intersecting one another in at least one example.

It will be further appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and sub-combinations of the various features, functions, and/or properties disclosed herein as well as any and all equivalents thereof.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A food preparation machine comprising:
a motor housing comprising a gearbox; and
a seasoning drum comprising a cylindrical body extending through an opening of the motor housing, the seasoning drum further comprising a drive ring assembly interface comprising a magnet configured to couple to an exterior surface of the motor housing and to a drive ring assembly in the motor housing, wherein the drive ring assembly is coupled directly to the motor housing via a magnetic coupling and configured to rotate about its own central axis perpendicular to a direction of gravity, wherein the magnetic coupling cantilevers the drive ring assembly interface to the motor housing.

2. The food preparation machine of claim 1, wherein the magnet is a single strip, the strip extending around an entire circumference of the drive ring assembly.

3. The food preparation machine of claim 1, wherein the magnet is one magnet of a plurality of magnets, and where the plurality of magnets is equally spaced apart from one another around a circumference of the drive ring assembly interface.

4. The food preparation machine of claim 1, wherein the drive ring assembly interface comprises a circular L-shape with a planar portion being configured to physically couple to an exterior surface of the seasoning drum, the drive ring assembly interface further comprising a vertical portion perpendicular to the planar portion, the vertical portion comprising the magnet.

5. The food preparation machine of claim 1, wherein the drive ring assembly interface is biased toward an extreme end of the seasoning drum extending through the opening of the motor housing.

6. The food preparation machine of claim 1, wherein the seasoning drum extends through and protrudes from the opening of the motor housing.

7. The food preparation machine of claim 1, wherein the motor housing further comprises an angle adjustment device, and where the angle adjustment device adjusts an orientation of the seasoning drum and the motor housing relative to a surface to which the motor housing is coupled.

8. The food preparation machine of claim 1, wherein the seasoning drum further comprises a plurality of ledges, and where the plurality of ledges is configured to assist food tumbling within the seasoning drum.

9. The food preparation machine of claim 1, wherein the drive ring assembly interface further comprises one or more slots, where the slots are configured to receive a tool adapted to decouple the drive ring assembly from the motor housing.

10. A method comprising:
inserting a seasoning drum through an opening of a motor housing; and
coupling the seasoning drum to the motor housing via a plurality of magnets arranged on a vertical surface of a drive ring assembly interface, the drive ring assembly interface being physically coupled to the seasoning drum via one or more fasteners extending through its planar surface, wherein the seasoning drum is configured to rotate about an axis of rotation perpendicular to gravity, and wherein a magnetic coupling is configured to detach the drive ring assembly interface from motor housing in response to a force normal to gravity.

11. The method of claim 10, further comprising decoupling the drive ring assembly interface from the motor housing via a tool extending through a slot of the drive ring assembly interface, the decoupling further comprising actuating the tool away from the seasoning drum to overcome the magnetic coupling between the plurality of magnets of the drive ring assembly interface and a surface of the motor housing.

12. The method of claim 10, further comprising adjusting an orientation of the seasoning drum and the motor housing via an angle adjustment mechanism, and where the angle adjustment mechanism is configured to adjust an angle of the seasoning drum and the motor housing relative to an axis of a surface upon which the motor housing rests.

13. A conveyor assembly comprising:
a motor housing comprising a gearbox, the gearbox configured to rotate the motor housing;
a seasoning drum comprising a plurality of ledges configured to tumble food in the seasoning drum; and
a drive ring assembly interface comprising a first surface physically coupled to an exterior surface of the seasoning drum via one or more fasteners, the drive ring assembly interface further comprising a second surface perpendicular to the first surface, where the second surface comprises a plurality of magnetic targets configured to couple to a magnetic exterior surface of the motor housing, wherein a drive ring assembly, coupled to the drive ring assembly interface, is in face-sharing contact with one or more drive rollers of the motor housing, wherein the seasoning drum is configured to rotate about its own central axis perpendicular to a direction of gravity, wherein the plurality of magnets cantilevers the seasoning drum to the motor housing, and wherein the seasoning drum is detached from the motor housing in response to a force normal to the direction of gravity.

14. The conveyor assembly of claim 13, wherein the one or more drive rollers rotate the drive ring assembly.

15. The conveyor assembly of claim 13, wherein the drive ring assembly is positioned within the motor housing.

16. The conveyor assembly of claim 13, wherein the drive ring assembly interface further comprises a plurality of slots, each slot of the plurality of slots being alternatingly arranged between the plurality of magnet targets on the first surface.

17. The conveyor assembly of claim 16, wherein the slots are configured to receive a tool, the tool configured to decouple the drive ring assembly interface from the motor housing.

18. The conveyor assembly of claim 13, wherein the seasoning drum comprises a first extreme end located on a first side of the motor housing and where the seasoning drum further comprises a second extreme end located on a second side of the motor housing, and where the drive ring assembly interface is biased toward the first side.

19. The conveyor assembly of claim 13, wherein the first surface of the drive ring assembly interface extends into a plane of the motor housing.

20. The conveyor assembly of claim 13, wherein the motor housing comprises magnetic steel.

* * * * *